US012078321B2

(12) United States Patent
Natchoo et al.

(10) Patent No.: US 12,078,321 B2
(45) Date of Patent: Sep. 3, 2024

(54) WIDE-APERTURE LIGHT UNIT

(71) Applicant: ARTEFFECT, Romainville (FR)

(72) Inventors: Philippe Natchoo, Roissy-en-brie (FR); Charles Comperat, Saint-Ouen-sur-Seine (FR); Sylvain Strazielle, Montreuil (FR); Simon Blatrix, Paris (FR); Aurélien Linz, Nozay (FR)

(73) Assignee: ARTEFFECT, Romainville (FR)

( * ) Notice: Subject to any disclaimer, the term of this patent is extended or adjusted under 35 U.S.C. 154(b) by 0 days.

(21) Appl. No.: 17/995,443

(22) PCT Filed: Apr. 7, 2021

(86) PCT No.: PCT/EP2021/059075
§ 371 (c)(1),
(2) Date: Oct. 4, 2022

(87) PCT Pub. No.: WO2021/204882
PCT Pub. Date: Oct. 14, 2021

(65) Prior Publication Data

US 2023/0175672 A1 Jun. 8, 2023

(30) Foreign Application Priority Data

Apr. 7, 2020 (FR) ....................................... 2003482

(51) Int. Cl.
*F21V 14/04* (2006.01)
*F21V 7/00* (2006.01)
(Continued)

(52) U.S. Cl.
CPC ............ *F21V 14/04* (2013.01); *F21V 7/0066* (2013.01); *F21V 14/02* (2013.01); *F21W 2131/406* (2013.01)

(58) Field of Classification Search
CPC ........ F21V 14/02; F21V 14/04; F21V 7/0033; F21V 7/0066; F21W 2131/406
See application file for complete search history.

(56) References Cited

U.S. PATENT DOCUMENTS 4,037,096 A 7/1977 Brendgord et al.
4,706,168 A 11/1987 Weisner
(Continued)

FOREIGN PATENT DOCUMENTS

EP 1741975 A2 1/2007
FR 2822553 A1 9/2002
(Continued)

OTHER PUBLICATIONS

French Search Report received for Application No. 2003482, Feb. 25, 2021.
(Continued)

*Primary Examiner* — Erin Kryukova
(74) *Attorney, Agent, or Firm* — Greer, Burns & Crain, Ltd

(57) ABSTRACT

A light unit configured to emit at least one wide-aperture light beam including a transmitter system, configured to emit at least one light beam, the beam(s) being emitted in an angular range of 360° around the transmitter system; a reflector system surrounding the transmitter system, arranged to receive each light beam propagating from the transmitter system and to reflect each light beam received towards the outside of the light unit. The reflector system includes a frame surrounding the transmitter system and bearing a reflecting surface extending around the transmitter system between two opposite edges of the frame, the reflector system and/or the transmitter system are mounted such that they can be moved relative to one another and such that they can be positioned relative to one another so as to modify the interception area of the beam emitted by the
(Continued)

transmitter system along the reflecting surface of the reflector system.

18 Claims, 7 Drawing Sheets

(51) Int. Cl.
*F21V 14/02* (2006.01)
*F21W 131/406* (2006.01)

(56) References Cited

U.S. PATENT DOCUMENTS 4,855,884 A * 8/1989 Richardson ............... F21V 7/16 362/346
2015/0043191 A1* 2/2015 Deng ...................... F21V 7/048 362/17
2016/0091176 A1* 3/2016 Wang ........................ F21V 7/28 362/277
2016/0123549 A1 5/2016 Linz et al.
2017/0059133 A1 3/2017 Campetella
2019/0186713 A1* 6/2019 Chiang ..................... F21V 7/16
2022/0282852 A1* 9/2022 Høyer ................... F21V 7/0033

FOREIGN PATENT DOCUMENTS

GB 2072825 A 3/1981
JP H08220467 A * 8/1996 .............. F21V 14/02
WO WO-0136871 A1 * 5/2001 .............. F21V 14/02

OTHER PUBLICATIONS

International Search Report and Written Opinion received for PCT/EP2021/059075, mailed Jul. 6, 2021.

* cited by examiner

[Fig. 1]
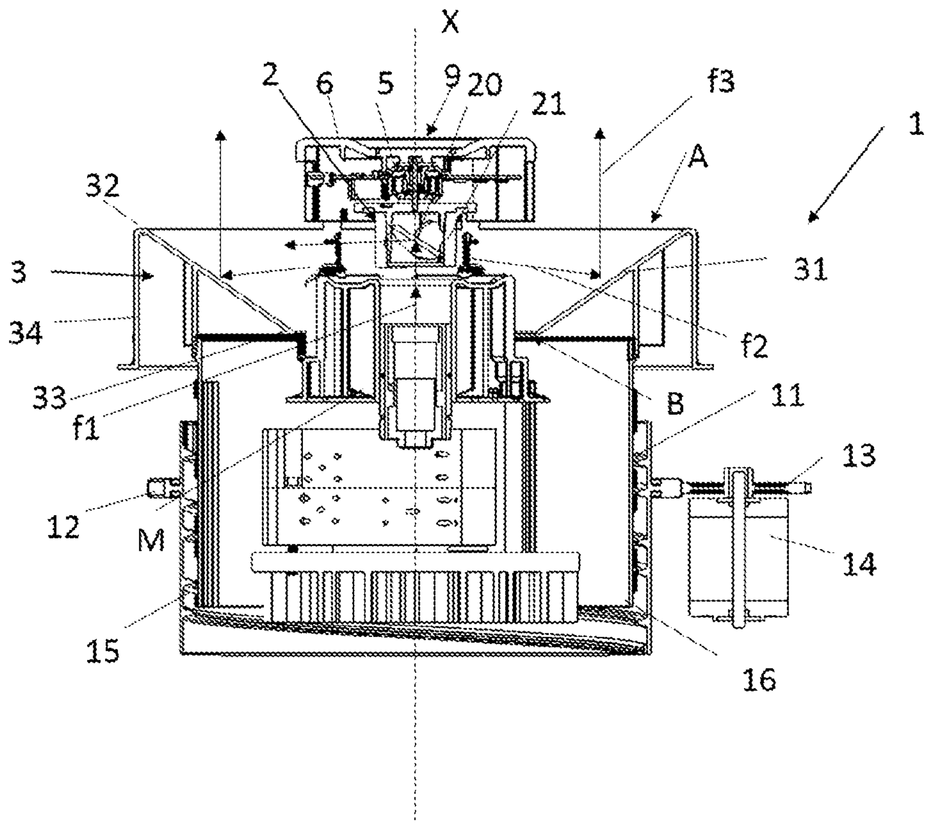
[Fig. 2]
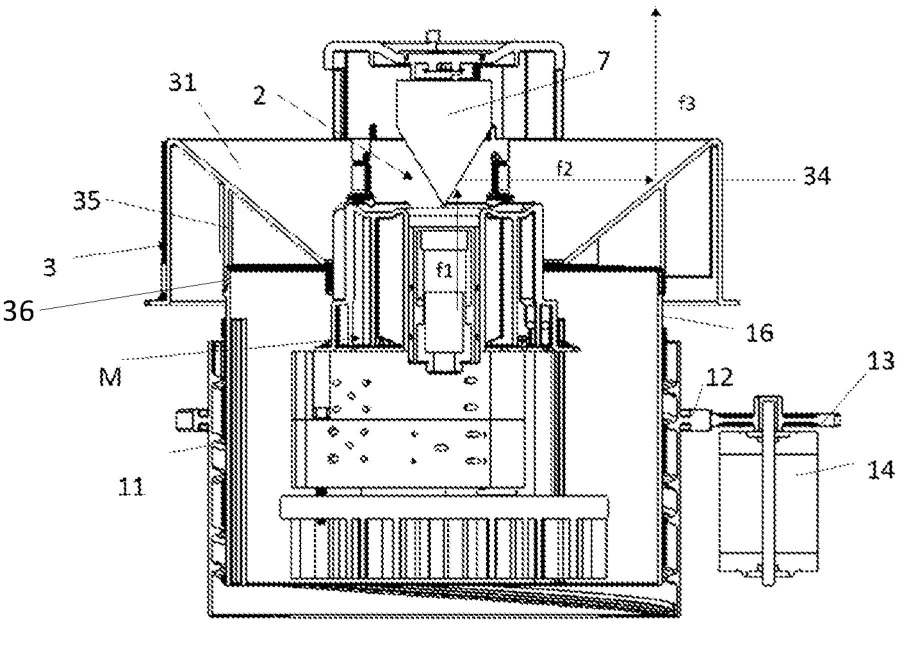

[Fig. 2A]
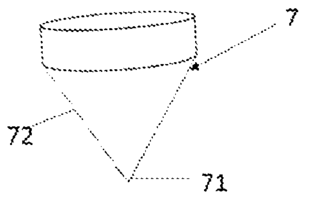
[Fig. 2B]
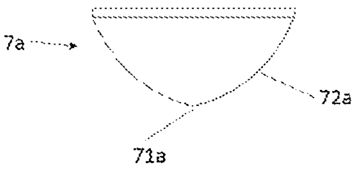
[Fig. 2C]
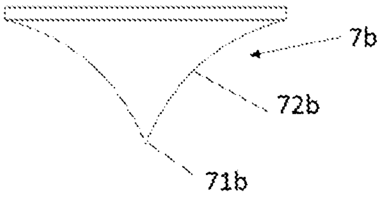
[Fig. 3]
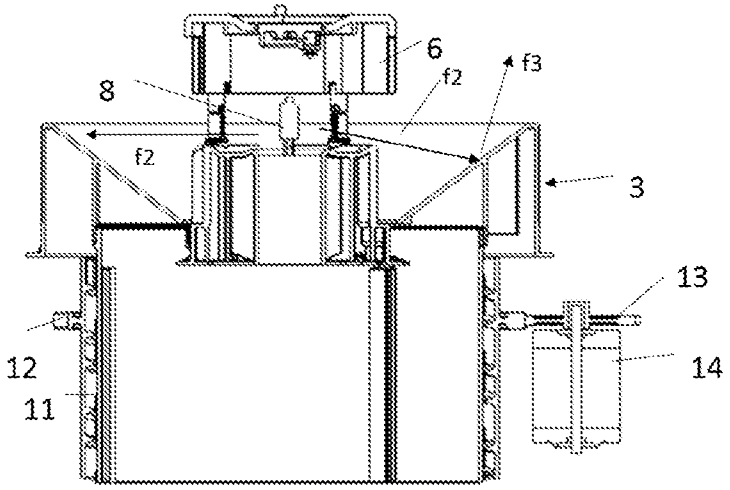

[Fig. 4]
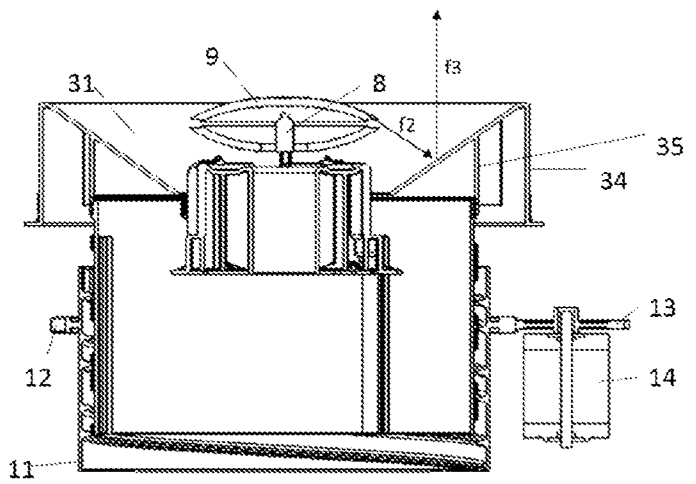
[Fig. 5]
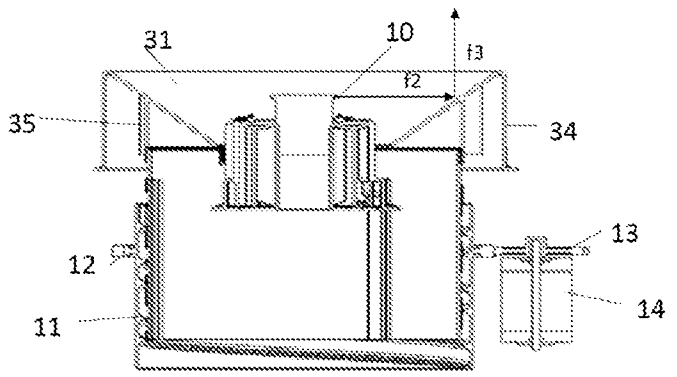
[Fig. 6]
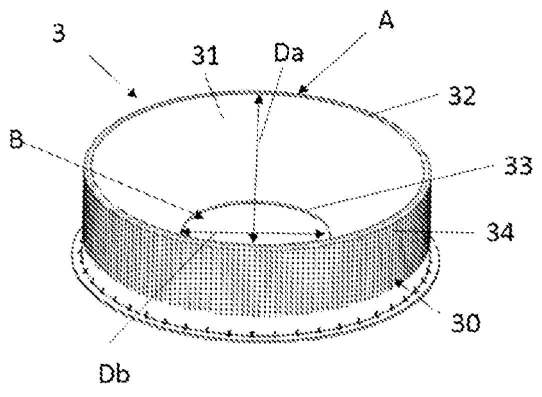

[Fig. 7]
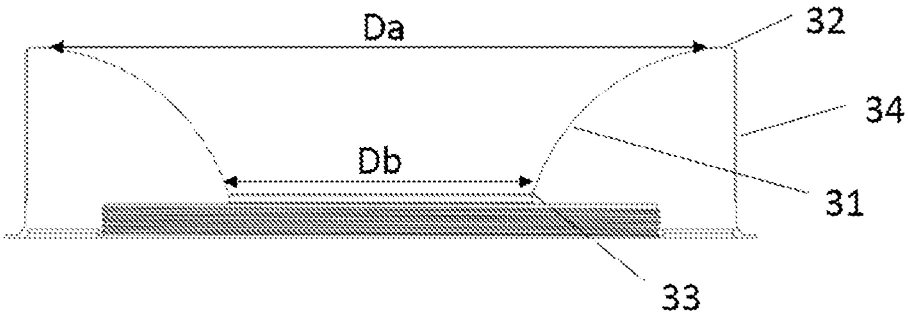
[Fig. 7A]
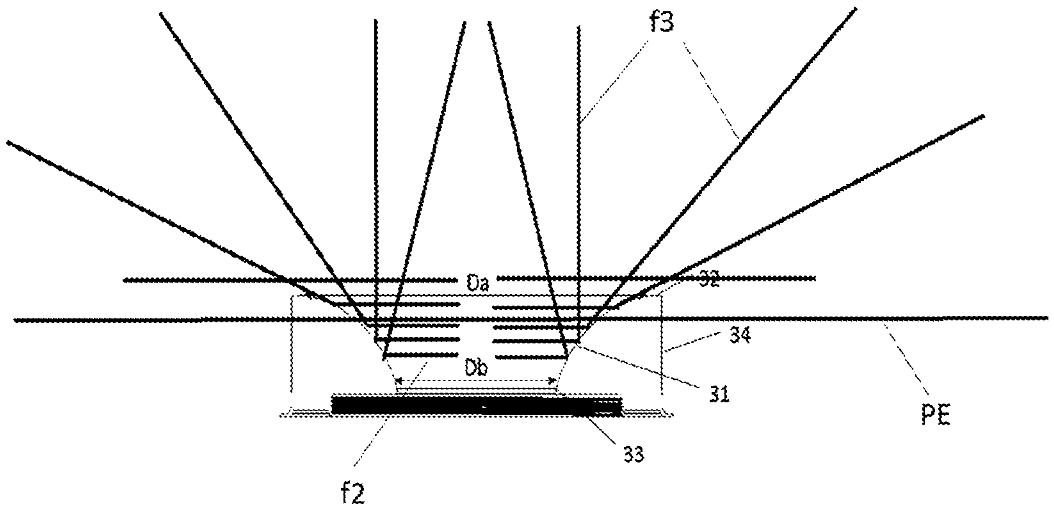
[Fig. 8]
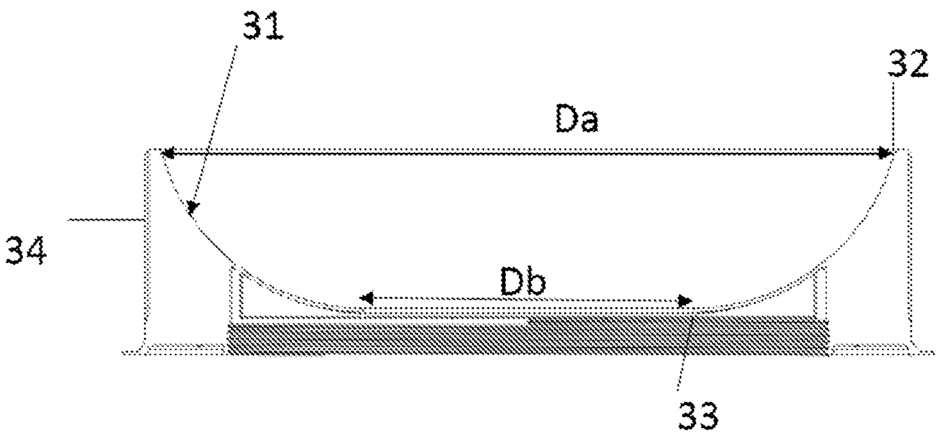

[Fig. 9]
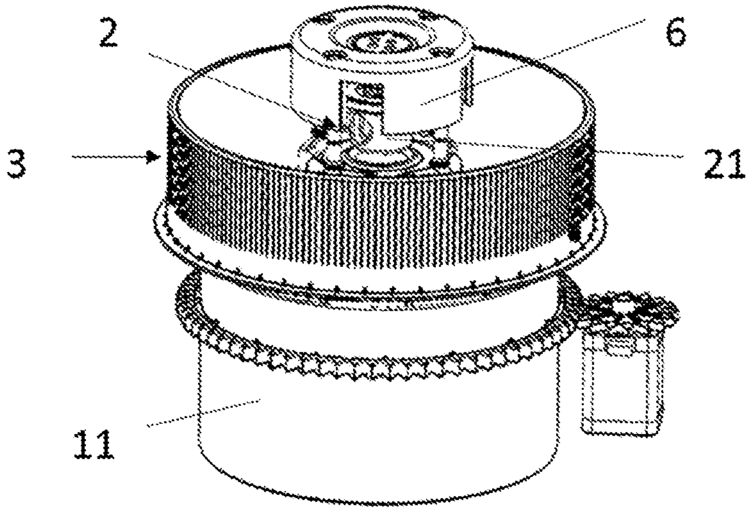
[Fig. 10]
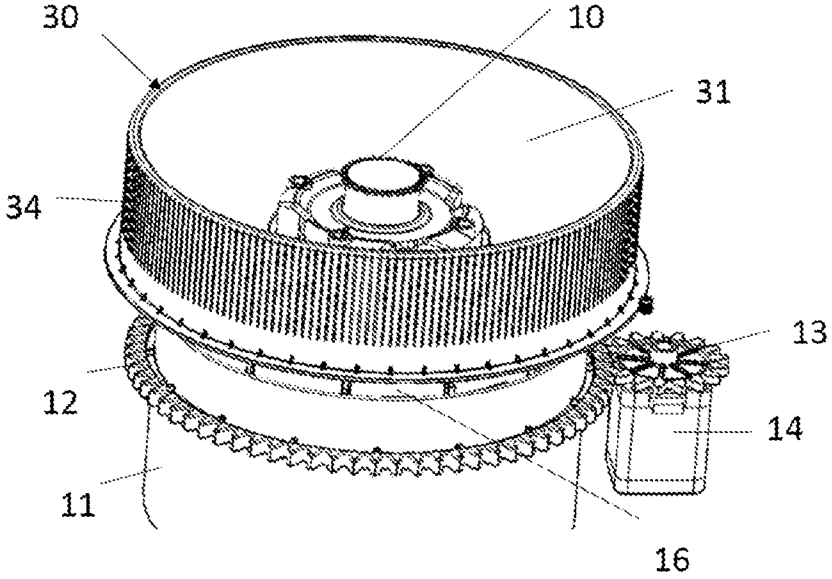

[Fig. 11]
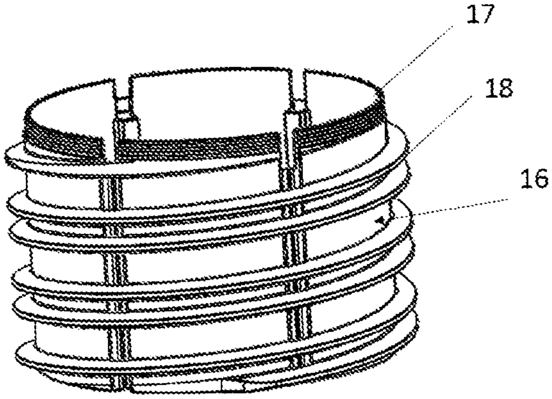
[Fig. 12]
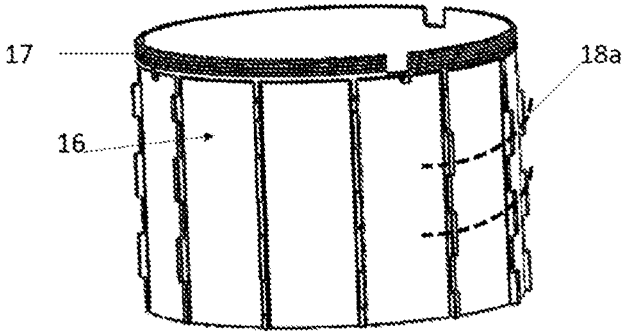
[Fig. 13]
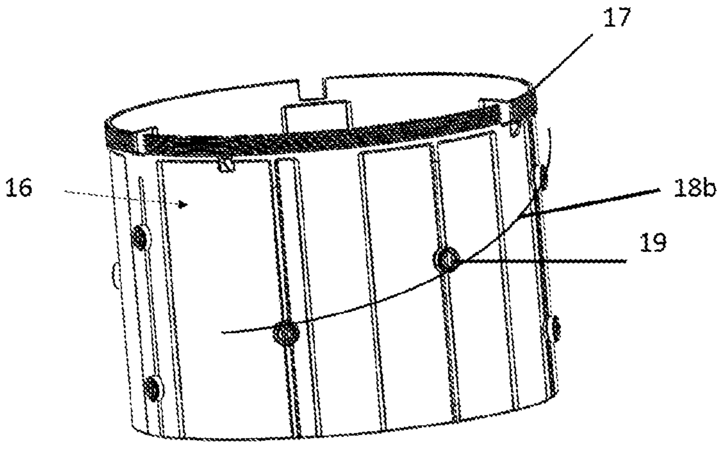

[Fig. 14]
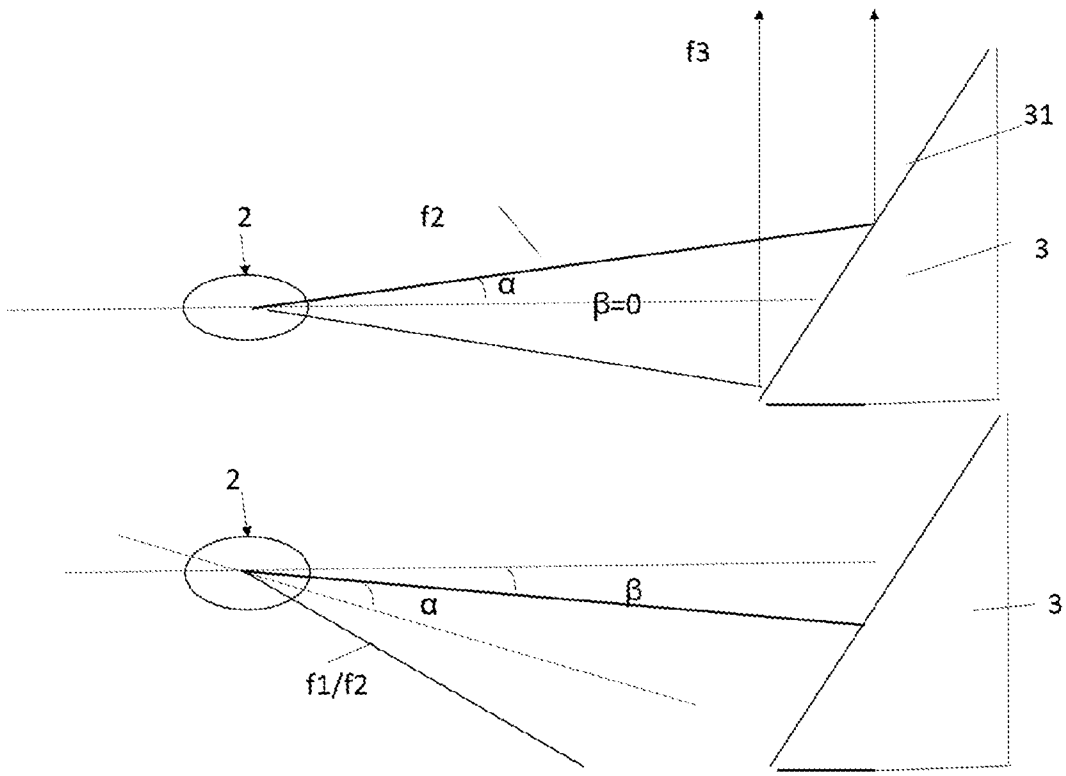
[Fig. 15]
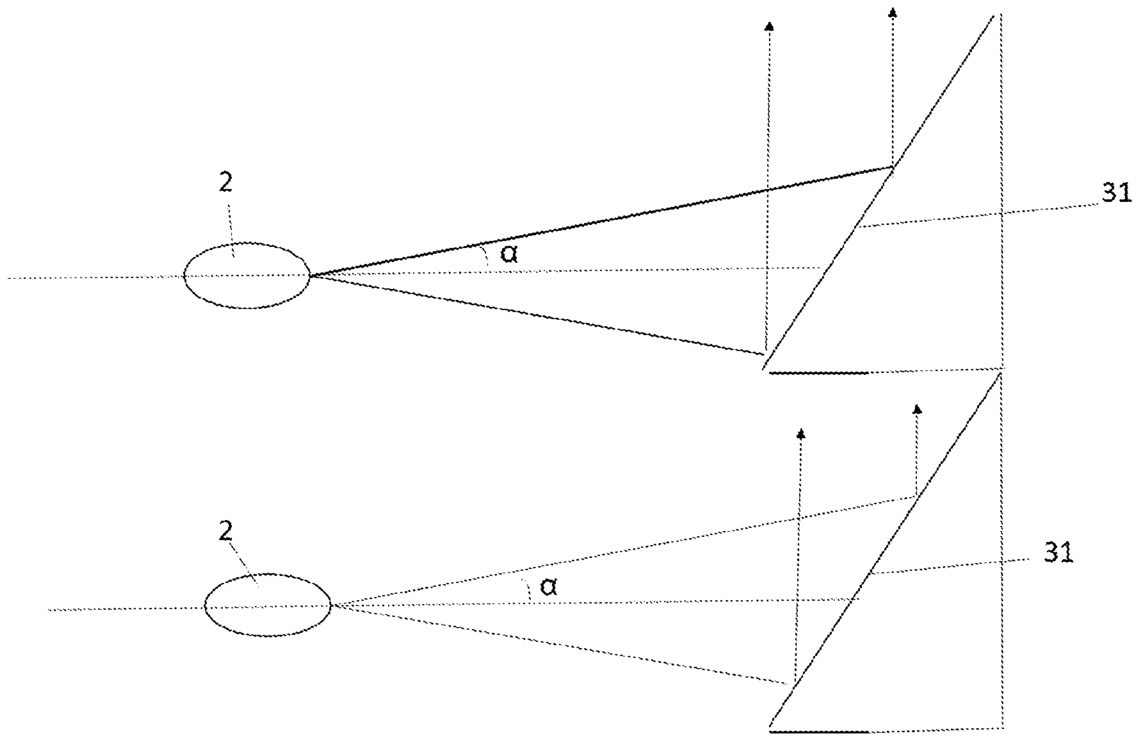

WIDE-APERTURE LIGHT UNIT

BACKGROUND

The present invention relates to a wide-aperture light device configured to emit light beams, making it possible, in particular, to create light effects. The field of the invention is more particularly that of stage lighting, in particular in the field of architecture and that of entertainment, for example in discos, concert auditoria, parades, theatre productions, live shows, dance, for public and private events, television programmes, etc. Other fields of application are also possible, such as for example the use of light beams for volume scanning.

Document FR-A-3 006 454 describes a light device comprising at least one source arranged to emit a light beam, an optical system arranged to send each light beam from a central zone in several possible directions contained in a light cone, the vertex of which is located in the central zone, such that each light beam propagates in its light cone, and a reflector system arranged to receive each light beam propagating in its light cone or plane and to reflect each received light beam in an enclosed space and outside its cone, said reflector system preferably being arranged to move between several positions such that a change of position changes the trajectory of a light beam reflected by the reflector system. Such a light system allows a light beam to be converted into a light surface.

Each source preferably comprises a laser or a light-emitting diode or any other suitable light source. The optical device itself comprises a reflective surface mounted in rotation in the central zone of the lighting system about an axis. This reflective surface is preferably arranged to reflect each light beam such that after reflection by the reflective surface, each light beam propagates in its light cone or in a plane in a direction which depends, preferably, on an angular position of the reflective surface about its axis.

The reflector system has the form of a polygon equipped with several sides, each of its sides being formed by at least one mirror mounted in rotation about an axis (this axis preferably being parallel to the plane of light of each light beam in the case where the cones of light are planes). The reflector system can be mounted in translation (preferably perpendicular to the plane of light of each light beam in the case where the cones of light are planes).

In EP-A-3135992, a lighting device is proposed making it possible to produce scenographic light effects and which comprises a frame, a light source mounted on the frame, a light guide coupled to the light source to define an optical path along a longitudinal axis and a first mirror arranged along the longitudinal axis (A) and facing the light source to reflect the light beam towards the light source. The device also comprises a second mirror movable with respect to the frame and facing the first mirror to reflect the light beam reflected by the first mirror. In this way, the shape and the orientation of the light beam may be varied depending on the position of the second mirror along the longitudinal axis between the source and the first mirror and also on its inclination. However, these variations only relate to the opening/closing of the light beam and its orientation, which remains limited as possible effects.

FR-A-2479414 proposes a lighting device for an operating field comprising an emitter system which comprises a light source which sends a light beam towards a reflection surface of a reflecting body which returns the light beam towards a ring reflector element. The reflecting body is borne by a support which bears other reflecting bodies, this support can be driven in rotation which makes it possible to change the reflecting body. Each reflecting body is borne on an axis resting on an adjustment piece which has an inclined surface which can be driven in translation by a threaded rod so that the reflecting body can be height-adjusted with respect to the light source and the reflector system. There is thus a displacement of the reflective surface with respect to the light source and the ring reflector element. Such a lighting device makes it possible to illuminate an operating field with as little shadow as possible regardless of the distance between the operating field and the lighting device while making it possible to vary the light intensity and the size of the field. However, the system for driving the reflecting body in displacement is relatively complex and only aims to allow a fine adjustment of the lighting of the operating field.

Document U.S. Pat. No. 4,706,168 proposes an optical examination device, comprising an optical assembly and a lighting assembly, the optical assembly determining a vertical optical axis for examination of an object. The lighting assembly comprises a remote light source coupled with a flexible bundle of optical fibres ending in a light ring intended to create a sheath or a hollow cylinder of light coaxial with the optical axis and directed towards the product. A first ring element concentric with the optical axis delimits a gap between the optical assembly and the product to be examined and has a reflecting outer surface intended to deflect the sheath or the light cylinder in a first direction, and a second ring element having a reflective surface placed in the path of the light reflected by the first reflective surface and intended to deflect the light towards the product to be examined. A differential drive mechanism is intended to move the first and second ring elements at different rates of movement in the axial direction. It is thus possible to vary the distance between the two ring elements. When the angle of incidence changes, the two ring reflector elements are moved together, but with a varying gap between them. Thus, the light coming from the first surface impinges on a different region of the second surface to change the angle of incidence but maintain the same focal point. This simultaneous driving of the two ring elements is necessary to guarantee the correct exposure while offering a wide range of lighting, shadows and contrasts. Such a device thus aims to illuminate an object to allow its exposure.

These devices thus allow an adjustable lighting of a site (operating field) or object for which the best possible lighting is sought.

SUMMARY

According to a first aspect, the invention relates to a light device for emitting wide-aperture light beams the structure of which, which is simple to implement, makes it possible to obtain different and varied light effects with the possibility of using varied light sources while being cost-effective.

To this end, the invention relates to a wide-aperture light device configured to emit at least one light beam comprising:

an emitter system configured to emit at least one light beam, the beam or beams being emitted in an angular range of 360° around said emitter system;

a reflector system surrounding the emitter system, arranged to receive each light beam propagating from the emitter system and to reflect each received light beam towards the outside of the device, characterized in that said reflector system comprises a frame surrounding the emitter system and bearing a reflective surface extending around the emitter system, between two opposite edges of the frame, and in that the reflector system and/or the emitter system are mounted driveable in displacement with respect to one another, so that they can be positioned relatively with respect to one another in order to modify the interception zone of the beam emitted by the emitter system, along the reflective surface of the receiving system.

Thus, advantageously, it is possible to modify the trajectory of the light beam/beams reflected by the reflector system and thus to cause the light beam/beams emitted at output by the light device to vary by choosing a relative positioning of the emitter system and the reflector system. Thus, for example, it is possible to cause the aperture angle or the apparent diameter of the beam emitted by the light device to vary. This makes it possible to easily modify the light effects with such a light device, thus offering a rich palette of possible light effects, which can extend up to turning off the emitted light beam, when the relative positioning of the emitter system and of the reflector system no longer allows the interception of the light beam emitted by the emitter system.

It is thus possible to define light effects by simply displacing the emitter system and the reflector system with respect to one another, the dimensions or the shape of the light beam emitted by the light device being modified depending on the area of impact of the beam emitted by the emitter system on the reflector system.

In addition, the relative displacement between the emitter system and the reflector system can make it possible to position the emitter system outside the reflector system which causes a suppression of the light beam emitted by the light device and thus an additional light effect of the device.

Preferably, the emitter system is configured to emit at least one light beam in an angular range of 360° preferably radially around said emitter system.

Advantageously, a light device according to the invention, to the extent that the beams emitted by the emitter system and the reflector system extend substantially in one and the same radial plane, allow an aperture angle over a half-space.

The light device according to the invention thus comprises means for driving in displacement the reflector system with respect to the emitter system or the emitter system with respect to the reflector system. It is possible to provide for means for driving the reflector system in displacement with respect to the emitter system and means for driving the emitter system in displacement with respect to the reflector system.

These means for driving in displacement are preferably means for driving in translation. They can be constituted by a screw and nut system, a slider system, a rack and pinion system, or any other suitable mechanical drive system actuated at least by a motor.

Advantageously, the means for driving in translation, comprising two cylinders having a circular transverse cross-section, mounted concentrically, the first being mounted, for example on a mount, held fixed in translation, the second cylinder being mobile in translation along the central axis of the two cylinders. The second cylinder bears at a free end the reflector system or the emitter system.

By mount is meant any support on which the emitter and receiver systems can be mounted and assembled.

Thus, the light device according to the invention can comprise a first cylinder having a circular transverse cross-section comprising support means on the mount, making it possible in particular to hold this cylinder fixed in translation but free in rotation with respect to the mount. The inner face of the wall of this cylinder has a spiral groove forming a female thread, the cylinder thus constituting the nut part of a screw and nut system of the driving means. A second cylinder is mounted concentrically in the first cylinder and has on its outer face a spiral groove forming a male thread engaged from one end of the second cylinder with the spiral groove of the first cylinder so that the second cylinder constitutes the "screw" part of the screw and nut system.

Advantageously, according to a first embodiment, the second cylinder has at its free end (not engaged in the first cylinder) the reflector system. Consequently, the reflector system which surrounds the emitter system is mobile in translation so that the interception zone of the beam or beams is modified along the profile of the reflective surface between the two edges of the receiving system.

In another embodiment, the second cylinder is arranged to bear at its end the emitter system. Consequently, the reflector system which is fixed for example surrounds the emitter system which is mobile in translation so that the interception zone of the beam or beams is modified along the profile of the reflective surface between the two edges of the receiving system.

Such a system is simple to produce and to implement while offering easy handling.

Preferably, the means for driving in translation are actuated by a motor, directly or using mechanical transmission means such as gear, belt, friction, cam, planetary gear transmission means.

The drive means thus comprise an actuation motor and transmission means for driving the first cylinder in rotation and thus allow the driving in translation of the second cylinder and thus of the reflector system.

Thus, when the transmission means are by gear assembly, they are constituted by a toothed wheel mounted in rotation on the drive axis of the motor and meshed with a toothed gear arranged on the outer face of the first cylinder.

During the driving in rotation of the toothed wheel by the motor, the first cylinder forming a nut is driven in rotation by the ring gear which engages with said toothed wheel, while remaining fixed in translation. As a result, the inner screw thread (spiral groove) which is driven in rotation, but held fixed in translation, causes the linear displacement of the second cylinder (screw) screwed into the first.

When the transmission means are belt transmission means, the first cylinder forms a pinion around which is wound a belt which cooperates with a pinion driven in rotation by the motor.

In this way, the transmission means are thus a belt, meshed at the periphery of the first cylinder (thus forming a pinion) and meshed on a pinion mounted on the axis for driving the motor in rotation.

The assembly of the two cylinders is installed in a mount of the light device so that the emitter system is surrounded by the reflector system, the linear displacement of the reflector system taking place along the central axis of the two cylinders, corresponding to an axis perpendicular to the plane of the mount of the light device.

In the device according to the invention, the reflector system comprises a frame bearing a reflective surface extending between two opposite edges of the frame. These edges preferably each define an outline the shapes of which are identical but having different dimensions, the reflective surface extending from one edge to the other of the edges with a continuous or variable surface profile which makes it possible to return a light beam in a direction that is different from that of the light beam emitted by the emitter system. Thus, advantageously, the relative displacement between the emitter system and the reflector system makes is possible to easily vary the light effects of the light device according to the invention. By frame is meant any suitable support bearing the reflective surface and which surrounds the emitter system.

Preferably, the emitter system is positioned in the central zone of the light device.

According to a variant, the emitter system is at the centre of the space delimited by the receiver system. This reflector system can have a transverse cross-section having a circular, oval or polygonal shape such as square, triangular or even for example a star-shaped cross-section, the centre of which is the emitter system. In geometry, a part A of a real affine space E is called star-shaped with respect to a point a of A, for any point x of A, the segment [a, x] is contained in A, i.e. in A, any point can be connected to a by a rectilinear path.

Advantageously, the reflector system can have a reflective surface that is frustoconical in shape (straight continuous profile) and surrounding the emitter system, the relative displacement in translation of the reflector system with respect to the emitter system making it possible to modify the apparent diameter of the reflected light beam, due to the variation of the distance travelled by the light beam between the emitter system and the reflective surface of the reflector system.

As a variant, it is possible to anticipate the wall extending between the two edges with a continuous profile that is convex or concave, thus obtaining a “zoom effect” variation of the angle of the output beam. The relative displacement in translation of the reflector system with respect to the emitter system also causes the distance travelled by the beams between the emitter system and the reflective surface of the reflector system to vary.

It can also be envisaged to propose an emitter system which is located at the centre of the light device but on which the reflector system which surrounds it is not centred. Thus, advantageously, light effects are obtained that are different yet again.

Moreover, the reflective surface of the reflector system can have a variable profile, i.e. with a non-continuous profile line with variations, surface irregularities, such as alternating hollows and apexes, the profile thus having several apexes. A reflection of the specular or diffuse type can thus be proposed. It is also possible to have a reflective grating. To produce such a surface, it is possible to use, on the frame or support, paint, a vacuum metallization whether it be on glass, plastic or metal. In addition, the roughness and/or granularity of the reflective surface makes it possible to play with the specular or diffuse appearance of the resulting reflection. The reflective surface surrounds the emitter system in a continuous manner, but it can also be envisaged that it surrounds the emitter system in a discontinuous manner.

The reflector system is borne by the free end of the second cylinder of the drive means which have linking means arranged to cooperate with complementary linking means provided on said reflector system. It is thus possible to mount/dismount a reflector system on the drive means, which makes it possible to change the reflector system with a view to obtaining different light effects.

It is also possible to envisage the frame of the reflector system being made in a single piece with the second cylinder of the drive means.

Thus, according to a second aspect of the invention, an aim of the invention is thus also a reflector module comprising a reflector system and means for driving said reflector system in translation, capable of being installed in a mount of the light beam light device. Such a module can thus be installed in a light device according to the invention and the means for supporting this module in the light device according to the invention can also make it possible to remove it to install another therein. Thus, such a reflector module comprising a reflector system and means for driving said reflector system in translation is characterized in that said reflector system comprises a frame bearing a reflective surface extending, with a continuous or variable surface profile, between two opposite edges of the frame, the frame of the reflector system being borne by a system for driving in translation of the screw and nut, slider system, rack and pinion system type or of any other suitable mechanical drive system. The reflector system and the means for driving in translation are as already described.

The invention also relates to an emitter module comprising an emitter system and means for driving said emitter system in translation in which the emitter system is borne by a system for driving in translation of the screw and nut, slider system, or rack and pinion system type.

According to an embodiment of the device according to the invention, the emitter system comprises an optical system positioned in the light device and surrounded by the reflector system, this optical system being configured to send a light beam emitted by a light source, in the form of at least one light beam in a cone of light the apex of which is situated starting from the positioning zone of the optical system, the beam or beams being emitted in an angular range up to 360°, preferably radially around said optical system. The optical system and the reflector system are essentially in one and the same plane.

The light source is positioned remote from the optical system, preferably along the central axis of the drive means.

The cone of light emitted by the emitter system can be a plane of light, which extends parallel to the plane of the mount.

According to a variant of this embodiment, the optical system comprises a reflective surface mounted in rotation in the central zone about the central axis of the light device, this reflective surface being arranged to reflect each light beam originating from the light source such that after reflection by the reflective surface each light beam propagates in its cone of light in a direction which depends on an angular position of the reflective surface about its axis.

Beyond a speed of rotation w of the optical system about its axis, retinal persistence gives the spectator the impression of seeing a light surface the shape of which will vary depending on the instants at which each of the sources emits its beam; the shape of the light surface, initially contained in the cone of light of this beam, is modified by reflection on the reflector system which outputs this beam and thus this “light surface” outside the cone of light of this beam. In this case, the optical system converts each light beam in a first part of the “light surface” along its cone of light, then this light surface is deployed in a second part outside the cone of light of this beam after having been reflected by the reflector system.

Advantageously, light effects are created having great energy and high reproducibility.

According to another variant of this embodiment, the optical system is a fixed reflective part towards which the light beam is emitted by the light source to then be sent towards the reflector system. Preferably, this reflective part is in the form of a cone the apex of which is directed towards the light source and the wall of which has a straight, concave or convex profile, which allows the beam to be returned in a direction that is preferably principally radial around the emitter system.

According to another embodiment of the invention, the emitter system is constituted by a light source which directly emits one or more beams towards the reflector system which surrounds it, the source and the reflector system being substantially in one and the same plane.

In a first variant of this embodiment, the emitter system also comprises a mask configured so that only the light beams emitted towards the reflector system at 360° are emitted and propagate, preferably radially towards said reflector system.

In a second variant of this embodiment, the light source is associated with a reflective light guide, concentrating and redirecting the radiation from the source towards the reflector surrounding the light source (emitter system).

The light source can comprise several sources, the light beam generated by each source able to be for example a different colour from those of the others. Preferably the light source is a laser source. In a variant, the light source can be of the lamp type, associated with a light guide concentrating and directing the radiation from the source towards the optical system.

The light source can be constituted by a lamp, having at least one ring of light emitting diodes (LEDs) or laser diodes each emitting a light beam. Such an arrangement of LEDs makes it possible to have an emitter system that is simple to implement and reliable.

Of course, the emitter system can be constituted by any light source, be that an LED or laser lamp, potentially coupled with a fixed optical system directly connected and fixed to the source and making it possible to collimate or shape the beam as desired (divergence/aperture of the beam, beam width).

Similarly, the light sources can be constituted by the association of several sources (multi-LED or multi-laser diode).

The light device according to the invention also comprises a control system, by which it is possible to modify the light surfaces in real time and to create light choreographies by displacing the reflector system and/or the emitter system with respect to one another, by playing with the modulation and the power of the source or sources.

BRIEF DESCRIPTION OF THE DRAWINGS

The invention will now be described in more detail using embodiment examples of the device according to the invention represented in the figures, which represent:

FIG. 1 a longitudinal cross-section view of a light device according to a first embodiment of the invention;

FIG. 2 a longitudinal cross-section view of a variant of an embodiment of FIG. 1;

FIG. 2A a perspective view of the fixed optical system of FIG. 2;

FIG. 2B a cross-section view of a variant of the optical system of FIG. 2A;

FIG. 2C a cross-section view of another variant of the optical system of FIG. 2A;

FIG. 3 a longitudinal cross-section view of a second embodiment of the invention;

FIG. 4 a longitudinal cross-section view of a variant of the mode of FIG. 3;

FIG. 5 a cross-section view of a variant of the mode of FIG. 3;

FIG. 6 a perspective top view of the reflector system of the device according to FIG. 1;

FIG. 7 a transverse cross-section view of a variant of the reflector system according to the invention;

FIG. 7A a view according to FIG. 7 representing the beams emitted on the reflector system;

FIG. 8 a transverse cross-section view of another variant of the reflector system according to the invention;

FIG. 9 a perspective top view of the light device of FIG. 1;

FIG. 10 a perspective top view of the light device of FIG. 5;

FIG. 11 a lateral perspective view of a second cylinder of a device according to the invention;

FIG. 12 a lateral perspective view of a variant of a second cylinder of a device according to the invention;

FIG. 13 a lateral perspective view of another variant of a second cylinder of a device according to the invention;

FIG. 14 a diagrammatic representation of a light beam emitted by an emitter system of the light device according to the invention; and FIG. 15 a diagrammatic representation of a light beam emitted by the light device according to two relative positionings of the reflector system with respect to the emitter system.

DETAILED DESCRIPTION

As can be seen in FIG. 1, the light device 1 comprises an emitter system 2 positioned here in the centre of the light device 1 and a reflector system 3 completely surrounding the emitter system 2 and positioned in a similar plane. If the reflector system 3 has a circular transverse cross-section, the emitter system 2 is the centre of the circle thus formed.

The emitter system 2 is mounted on a mount of the light device. This emitter system 2 comprises an optical system positioned in a central zone of the device 1 and associated with a light source in the form of a module M. This optical system is configured to return a light beam f1 emitted by the light source, such as a laser source, or any other source of the light emitting diode or lamp type placed on the mount and emitting in the direction of the optical system.

The optical system sends the light beam f1, in the form of at least one light beam f2, in a cone of light the apex of which is situated in the central zone symbolized by the central axis X of the device 1. The beam f2 extends around the optical system at 360° and preferably in a radial zone around the optical system.

This optical system comprises a reflective surface 20 borne by sleeve 21 driven in rotation about the central axis X of the light device 1, this reflective surface 20 such as a mirror being driven in rotation using a motor 5 fixed to the sleeve 21, the motor 5 being enclosed in a casing 6 (see FIG. 9).

The reflective surface is constituted by a mirror 20 having an inclination and reflecting each light beam f1 originating from the light source so that after reflection by the reflective surface 20, each light beam f2 propagates in its cone of light in a direction that depends on an angular position of the reflective surface about the axis X. In the example shown, the mirror 20 has an inclination at 45°, the beams f2 extending radially towards the reflector system 3.

The optical system is thus arranged to send each light beam f2 from the central zone and more exactly from the reflective surface 20 situated in this central zone 9, in several possible directions contained in a plane, called "plane of light" to give it a name so as to correctly identify it, specific to this beam so that each light beam f2 propagates in its plane of light.

The plane of light of each light beam f2 is preferably radial and horizontal as can be seen in FIG. 14. The planes of light of the different light beams are preferably parallel to one another.

The optical system is arranged so that this direction of a light beam f2 explores all the orientations at 360 degrees radially around the central zone 9, i.e. around the reflective surface 20 or around the axis X, when the reflective surface 20 makes a complete turn about its axis X and this light beam f1 is emitted by its source during this complete turn.

In a variant as seen in FIG. 2, the optical system is a fixed reflective part 7 towards which is emitted a light beam f1 by a light source such as a laser source, LED source or lamp. Thus, this reflective part 7 is in the form of a cone the apex 71 of which is directed towards the light source and the wall 72 of which has a straight profile (see FIG. 2A). This reflective part in the shape of a cone can also have an apex 71*a* and a wall 72*a* having a concave profile such as part 7*a* represented in FIG. 2B or with an apex 71*b* with a wall having a convex profile 72*b* like the part 7*b* visible in FIG. 2C.

In FIGS. 3, 4 and 5, different embodiments of the emitter system 2 are represented. Thus in FIG. 3, the emitter system 2 is constituted by the light source such as a lamp 8 the light radiation of which is masked using a casing 6 so that the light beam or beams f2 are emitted at 360°, preferably principally radially in the direction of the reflector system 3 which surrounds the light source 8.

In a variant, the source 8 is associated with a reflective light guide 9 which concentrates and directs, preferably radially, the light from the source 8 towards the reflector system 3.

In another variant, the light source 10 is constituted by at least one ring of light emitting diodes (LEDs) or laser diodes emitting one or more light beams f2, in particular in the direction of the reflector system 3.

The emitter system 2, whatever it may be, thus makes it possible to create a cone of light which corresponds to the aperture angle α of the light source. In the case of a light source of the laser type, there is thus a very small angle α, and a light beam that is very narrow, which tends towards a plane of light, extending radially towards the reflector system 3 (see FIG. 14).

In the case of a source of the lamp type, there is a beam f2 with an aperture angle α that is much larger and there is thus a "cone" of light at 360° (see FIG. 14).

In addition, as can be seen in FIG. 14, the emitter system 2 can create a cone in the cone, the emitter system 2 being able to be positioned so that the aperture angle α is centred on the horizontal (β=0) for example with an optical system the reflective surface 20 of which is inclined at 45° or with an angle β that is non-zero in the case of a reflective surface which is no longer at 45° (see FIG. 14).

The reflector system 3 represented in FIGS. 1, 2, 3, 4, 5, 6, has a reflective surface 31 which surrounds the emitter system 2. The reflective surface 31 returns the beams f2 in the form of output beams f3. This reflective surface 31 is borne in a frame 30 which has opposite edges 32, 33 which define two parallel faces A and B the contours of which are identical in shape but have different dimensions. In the examples shown, the reflector system 3 has a circular transverse cross-section and the reflective surface 31 forms the frustum of a cone, between the edges 32 and 33, which respectively define two faces in the form of a disc having different diameters Da and db, Da>db. The frustoconical reflective surface 31 surrounds the emitter system 2 with a straight continuous profile.

The reflector system 3, namely the frame or support 30, also has a wall 34 in the shape of a ring, that is concentric, extending parallel to the axis X of the device 1 (axis perpendicular to the frame) from the edge 32 defining the disc A having a larger diameter and surrounding the reflective surface 31. In FIGS. 7 and 8, it can be seen that the reflecting wall 31 which extends between the two edges 32, 33 can also have a convex profile 31*a* or a concave profile 31*b*. Consequently, a "zoom effect" variation of the angle of the output beam f3 is thus obtained.

As can be seen in FIG. 7A, the beams f2 originating from the emitter system 2 are sent by the reflector system 3 with an aperture angle which makes it possible to emit the beams f3 which thus cover a half-space above the plane PE.

The emitter system 2 and/or the reflector system 3 are mounted driveable in displacement with respect to one another in the direction of the central axis X. To this end, the light device 1 according to the invention comprises means for driving in displacement the reflector system 3 with respect to the emitter system 2.

These means for driving in displacement are constituted in particular in the example shown, by means for driving the reflector system 3 in translation along the axis X of the screw and nut type. Thus, a first cylinder 11 having a circular transverse cross-section and a second cylinder 16 which bears at one end the reflector system 3 form said screw and nut system. The first cylinder 11 has on its inner face a spiral groove 15 in which is engaged a spiral groove or screw thread 18 arranged on the outer face of the second cylinder 16.

The screw and nut system is actuated using a motor 14 and transmission means. Thus, on its outer face, the first cylinder 11 comprises a ring gear 12 which meshes with a toothed wheel 13 driven in rotation by the motor 14.

In the example shown here, visible in FIGS. 11, 12 and 13, the second cylinder 16 has means for linking with the reflector system 3. These linking means can be screwing means 17 arranged to cooperate with screwing means 36 arranged on a wall 35 of the reflector system 3. Thus, the reflector system 3 has an intermediate wall 35 extending between the reflective surface 31 and the outer ring 34, parallel to said outer ring 34, and which has linking means 17 complementary to those provided on the second cylinder 16.

Thus, when the toothed wheel 13 is driven in rotation by the motor 14, the first cylinder 11 maintained fixed in translation in the mount of the device but free in rotation, is driven in rotation by the ring gear 12 meshed with the toothed wheel 13, and as a result, the inner screw thread 15 is also driven in rotation which causes the linear displacement, along the axis X merged with the central axis of the cylinders 11, 16 of the second cylinder 16 engaged by its screw thread 18 such as a spiral groove, in the spiral groove 15 (as represented in FIG. 11). The second cylinder 16 is thus driven in translation and in rotation or even only in translation (blocked in rotation).

In order to promote the driving of both cylinders 11, 16, while reducing in particular the friction between these two cylinders 11, 16, it is possible to anticipate that a screw thread 18*a* corresponding to the spiral groove arranged on the outer face of the second cylinder is discontinuous, which makes it possible to limit the friction, as is visible in FIG. 12.

In a variant, it is possible to anticipate placing along a spiral trajectory 18*b*, equivalent to a spiral groove that is complementary to the spiral groove 15, ball bearings 19 as can be seen in FIG. 13.

As can be seen with the light device of FIG. 1, a light is emitted in the form of a cylinder (disregarding any divergence of the light beam) the diameter of which depends on the diameter of the reflective surface 31 at the intersection with the plane of light emitted by the emitter system 2. The driving in displacement of the reflective surface 31 with respect to the emitter system makes it possible to modify the interception zone of the plane of light by the reflective surface of the reflector system which causes the diameter of the cylinder of light to vary at the output of the light device (see FIG. 15).

Of course, the invention is not limited to the examples that have just been described and numerous adjustments can be made to these examples without exceeding the scope of the invention.

The invention claimed is:

1. A wide-aperture light device, configured to emit at least one light beam comprising:

- an emitter system configured to emit at least one light beam, the beam or beams being emitted in an angular range of 360° around said emitter system;
- a reflector system surrounding the emitter system, arranged to receive each light beam propagating from the emitter system and to reflect each light beam received towards the outside of the light device;
- the reflector system comprises a frame surrounding the emitter system and bearing a reflective surface extending around the emitter system, between two opposite edges of the frame; and the reflector system is mounted driveable in displacement with respect to the emitter system, so that they can be positioned relatively with respect to one another in order to modify the interception zone of the beam emitted by the emitter system, along the reflective surface of the reflector system;
- the device further comprising means for driving the reflector system in displacement with respect to the emitter system, which are means for driving in translation, constituted by a screw and nut system, a slider system, or a rack and pinion system, actuated at least by a motor directly or by using mechanical translation means;
- the means for driving in translation comprising two cylinders having a circular transverse cross-section, mounted concentrically, a first of the two cylinders being mounted held fixed in translation, the second cylinder bearing at one free end the reflector system, the second cylinder being mobile in translation along the central axis of the two cylinders; and
- the second cylinder having at the one free end linking means arranged to cooperate with complementary linking means provided on the reflector system.

2. The device according to claim 1, characterized in that the two cylinders form a screw and nut system, the nut being formed by the first cylinder mounted fixed in translation and driveable in rotation, said first cylinder comprising on an inner face a spiral groove in which is engaged a spiral groove or screw thread arranged on the outer face of the second cylinder, forming the "screw" of the screw and nut system.

3. The device according to claim 2, characterized in that the mechanical translation means includes transmission means which are formed by gear assembly, constituted by the first cylinder comprising on its outer face a ring gear which meshes with a toothed wheel driven in rotation by the motor.

4. The device according to claim 2, characterized in that a screw thread arranged on the outer face of the second cylinder is discontinuous.

5. The device according to claim 2, characterized in that a spiral trajectory arranged on the outer face of the second cylinder, complementary to the spiral groove is constituted by ball bearings.

6. The device according to claim 1, characterized in that the emitter system comprises an optical system surrounded by the reflector system, this optical system being configured to send a light beam (f1) emitted by a light source positioned remote from the optical system, in the form of at least one light beam (f2) in a cone of light the apex of which is situated at the level of the optical system, the beam or beams (f2) being emitted in an angular range up to 360°, around said optical system, and the optical system is a fixed reflective part towards which the light beam (f1) is emitted by the light source to then be sent (f2) towards the reflector system.

7. The device according to claim 6, characterized in that the reflective part is in the form of a cone, the apex of which is directed towards the light source and the wall of which has a straight, concave or convex profile.

8. The device according to claim 1, characterized in that the opposite edges of the frame of the reflector system each define an outline the shapes of which are identical but having different dimensions, the reflective surface extending from one to the other of the edges.

9. The device according to claim 8, characterized in that the reflector system has a cross-section having a circular shape, the emitter system being located at a center of the cross section.

10. The device according to claim 8, characterized in that the reflector system has a frustoconical shape, the reflective surface extending between two edges having a circular cross-section and different diameters.

11. The device according to claim 8, characterized in that the reflective surface extends between the two edges with a profile that is straight, convex, or concave.

12. A reflector module comprising a reflector system and means for driving said reflector system in translation for a device according to claim 1, characterized in that said reflector system comprises a frame bearing a reflective surface extending between two opposite edges of the frame, the frame of the reflector system being borne by a system for driving in translation including a system incorporating in at least part a screw and nut, a slider system, or a rack and pinion system type.

13. An emitter module comprising an emitter system and means for driving said emitter system in translation for a device according to claim 1, characterized in that the emitter system is borne by a system for driving in translation including a system incorporating in at least part a screw and nut, a slider system, or a rack and pinion system type.

14. A wide-aperture light device, configured to emit at least one light beam comprising:

- an emitter system configured to emit at least one light beam, the beam or beams being emitted in an angular range of 360° around said emitter system;
- a reflector system surrounding the emitter system, arranged to receive each light beam propagating from the emitter system and to reflect each light beam received towards the outside of the light device;
- the reflector system comprises a frame surrounding the emitter system and bearing a reflective surface extending around the emitter system, between two opposite edges of the frame; and the reflector system is mounted driveable in displacement with respect to the emitter system, so that they can be positioned relatively with respect to one another in order to modify the interception zone of the beam emitted by the emitter system, along the reflective surface of the reflector system, the emitter system comprising an optical system surrounded by the reflector system, this optical system being configured to send a light beam (f1) emitted by a light source positioned remote from the optical system, in the form of at least one light beam (f2) in a cone of light the apex of which is situated at the level of the optical system, the beam or beams (f2) being emitted in an angular range up to 360°, around said optical system, and the optical system comprising a reflective surface mounted in rotation about an axis (X) perpendicular to the plane of the mount of the light device, this reflective surface being mounted in a bearing driven in rotation by a motor.

15. The device according to claim 14, characterized in that the light source is constituted by a laser source, a lamp, or at least one ring of light emitting diodes (LEDs) or laser diodes.

16. A wide-aperture light device, configured to emit at least one light beam comprising:

an emitter system configured to emit at least one light beam, the beam or beams being emitted in an angular range of 360° around said emitter system;

a reflector system surrounding the emitter system, arranged to receive each light beam propagating from the emitter system and to reflect each light beam received towards the outside of the light device;

the reflector system comprises a frame surrounding the emitter system and bearing a reflective surface extending around the emitter system, between two opposite edges of the frame; and the reflector system is mounted driveable in displacement with respect to the emitter system, so that they can be positioned relatively with respect to one another in order to modify the interception zone of the beam emitted by the emitter system, along the reflective surface of the reflector system, the emitter system being constituted by a light source which directly emits one or more beams towards the reflector system which surrounds it, the light source and the reflector system being substantially in one and the same plane.

17. The device according to claim 16, characterized in that the emitter system also includes a mask configured so that only the light beams emitted radially by the light source are sent towards the reflector system at 360°.

18. The device according to claim 16, characterized in that the light source is associated with a reflective light guide, concentrating and redirecting the one or more light beams from the light source towards the reflector system.

* * * * *